US 7,119,925 B2

(12) United States Patent
Kagami

(10) Patent No.: US 7,119,925 B2
(45) Date of Patent: Oct. 10, 2006

(54) IMAGE PROCESSING, IMAGE READING APPARATUS AND IMAGE PROCESSING METHOD

(75) Inventor: Yuichi Kagami, Yamanashi-ken (JP)

(73) Assignees: Seiko Epson Corporation, Tokyo (JP); Nisca Corporation, Yamanashi-Ken (JP)

( * ) Notice: Subject to any disclaimer, the term of this patent is extended or adjusted under 35 U.S.C. 154(b) by 969 days.

(21) Appl. No.: 09/986,465

(22) Filed: Nov. 8, 2001

(65) Prior Publication Data

US 2002/0159082 A1    Oct. 31, 2002

(30) Foreign Application Priority Data

Nov. 10, 2000 (JP) .............................. 2000-342816
Nov. 10, 2000 (JP) .............................. 2000-342820
Feb. 23, 2001 (JP) .............................. 2001-048197

(51) Int. Cl.
*H04N 1/40* (2006.01)
(52) U.S. Cl. ........................................ 358/1.9; 358/1.2
(58) Field of Classification Search ................ 358/1.2, 358/1.9, 1.15–1.16, 444, 468
See application file for complete search history.

(56) References Cited

U.S. PATENT DOCUMENTS 5,436,734 A * 7/1995 Yamauchi et al. .......... 358/448

6,480,625 B1 * 11/2002 Yamazaki ................... 382/167
6,570,565 B1 * 5/2003 Park et al. .................. 345/421
6,594,387 B1 * 7/2003 Pettitt et al. ................ 382/167

OTHER PUBLICATIONS

Patent Abstract of Japan, Publication No. 09-102874, Publication date Apr. 15, 1997.
Patent Abstract of Japan, Publication No. 2000-013621, Publication date Jan. 14, 2000.
Patent Abstract of Japan, Publication No. 05-122455, Publication date May 18, 1993.
Patent Abstract of Japan, Publication No. 07-284012, Publication date Oct. 27, 1995.

* cited by examiner

*Primary Examiner*—Thomas D. Lee
*Assistant Examiner*—Stephen Brinich
(74) *Attorney, Agent, or Firm*—Manabu Kanesaka

(57) ABSTRACT

An image processing apparatus stores image data according to color constituent, sets an order of correction value data to correct input image data for each color constituent according to a command that specifies an output order of the color constituents, performs color correction in a color correction operation circuit using the specified correction value data, and outputs the image data. Without an output order change circuit, it is possible to perform the color correction and output image data of the color constituents according to an output device, resulting in a compact apparatus.

4 Claims, 12 Drawing Sheets

FIG.2 lookup tables 403 color lookup table 403(a)

| matrix | memory | address |
|---|---|---|
| A1 $\begin{pmatrix} K_{11} & K_{12} & K_{13} \\ K_{21} & K_{22} & K_{23} \\ K_{31} & K_{32} & K_{33} \end{pmatrix}$ | R1 | $K_{11}$ | 0H |
| | | $K_{21}$ | 1H |
| | | $K_{31}$ | 2H |
| | G1 | $K_{12}$ | 3H |
| | | $K_{22}$ | 4H |
| | | $K_{32}$ | 5H |
| | B1 | $K_{13}$ | 6H |
| | | $K_{23}$ | 7H |
| | | $K_{33}$ | 8H |
| A2 $\begin{pmatrix} N_{11} & N_{12} & N_{13} \\ N_{21} & N_{22} & N_{23} \\ N_{31} & N_{32} & N_{33} \end{pmatrix}$ | R1 | $N_{11}$ | AH |
| | | $N_{21}$ | BH |
| | | $N_{31}$ | CH |
| | G1 | $N_{12}$ | DH |
| | | $N_{22}$ | EH |
| | | $N_{32}$ | FH |
| | B1 | $N_{13}$ | 10H |
| | | $N_{23}$ | . |
| | | $N_{33}$ | . |
| . | . | . | . | monotone lookup table 403(b)

| matrix | memory | address |
|---|---|---|
| Y1 | R1 | $N_{11}$ | 0H |
| | | $N_{21}$ | 1H |
| | | $N_{31}$ | 2H |
| | G1 | $N_{12}$ | 3H |
| | | $N_{22}$ | 4H |
| | | $N_{32}$ | 5H |
| | B1 | $N_{13}$ | 6H |
| | | $N_{23}$ | 7H |
| | | $N_{33}$ | 8H |
| Y2 | R2 | . | . |
| . | . | . | . |

FIG.3 register 502

| memory | matrix | | address |
|---|---|---|---|
| $A1$ $\begin{pmatrix} K_{11} & K_{12} & K_{13} \\ K_{21} & K_{22} & K_{23} \\ K_{31} & K_{32} & K_{33} \end{pmatrix}$ $A1'$ $\begin{pmatrix} K_{11} & K_{12} & K_{13} \\ K_{31} & K_{32} & K_{33} \\ K_{21} & K_{22} & K_{23} \end{pmatrix}$ | R1 | $K_{11}$ $(K_{11})$ | 0 H |
| | | $K_{21}$ $(K_{31})$ | 1 H |
| | | $K_{31}$ $(K_{21})$ | 2 H |
| | G1 | $K_{11}$ $(K_{11})$ | 3 H |
| | | $K_{21}$ $(K_{32})$ | 4 H |
| | | $K_{32}$ $(K_{22})$ | 5 H |
| | B1 | $K_{13}$ $(K_{13})$ | 6 H |
| | | $K_{23}$ $(K_{33})$ | 7 H |
| | | $K_{33}$ $(K_{23})$ | 8 H |

FIG. 7 lookup tables 403 color correction lookup table 403(a)

| matrix | memory | | address |
|---|---|---|---|
| A1 | R1 | $K_{11}$ | 0H |
| | | $K_{21}$ | 1H |
| | | $K_{31}$ | 2H |
| | G1 | $K_{12}$ | 3H |
| | | $K_{22}$ | 4H |
| | | $K_{32}$ | 5H |
| | B1 | $K_{13}$ | 6H |
| | | $K_{23}$ | 7H |
| | | $K_{33}$ | 8H |
| A2 | R2 | . | . |
| . | . | . | . |
| . | . | . | . | output order lookup table 403(b)

| matrix | memory | | address |
|---|---|---|---|
| V1 | R1 | 1 | 0H |
| | | 0 | 1H |
| | | 0 | 2H |
| | G1 | 0 | 3H |
| | | 1 | 4H |
| | | 0 | 5H |
| | B1 | 0 | 6H |
| | | 1 | 7H |
| | | 0 | 8H |
| V2 | R2 | 1 | AH |
| | | 0 | BH |
| . | . | . | . | monotone lookup table 403(c)

| matrix | memory | | address |
|---|---|---|---|
| Y1 | R1 | $N_{11}$ | 0H |
| | | $N_{21}$ | 1H |
| | | $N_{31}$ | 2H |
| | G1 | $N_{12}$ | 3H |
| | | $N_{22}$ | 4H |
| | | $N_{32}$ | 5H |
| | B1 | $N_{13}$ | 6H |
| | | $N_{23}$ | 7H |
| | | $N_{33}$ | 8H |
| Y2 | R2 | . | . |
| . | . | . | . |
| . | . | . | . |

FIG.8A $$\begin{bmatrix} R \\ G \\ B \end{bmatrix} = \overset{V1}{\begin{pmatrix} 1 & 0 & 0 \\ 0 & 1 & 0 \\ 0 & 0 & 1 \end{pmatrix}} \begin{bmatrix} R \\ G \\ B \end{bmatrix}$$

FIG.8B $$\begin{bmatrix} R \\ B \\ G \end{bmatrix} = \overset{V2}{\begin{pmatrix} 1 & 0 & 0 \\ 0 & 0 & 1 \\ 0 & 1 & 0 \end{pmatrix}} \begin{bmatrix} R \\ G \\ B \end{bmatrix}$$

FIG.8C $$\begin{bmatrix} G \\ R \\ B \end{bmatrix} = \overset{V3}{\begin{pmatrix} 0 & 1 & 0 \\ 1 & 0 & 0 \\ 0 & 0 & 1 \end{pmatrix}} \begin{bmatrix} R \\ G \\ B \end{bmatrix}$$

FIG.8D $$\begin{bmatrix} G \\ B \\ R \end{bmatrix} = \overset{V4}{\begin{pmatrix} 0 & 1 & 0 \\ 0 & 0 & 1 \\ 1 & 0 & 0 \end{pmatrix}} \begin{bmatrix} R \\ G \\ B \end{bmatrix}$$

FIG.8E $$\begin{pmatrix} B \\ G \\ R \end{pmatrix} = \overset{V5}{\begin{pmatrix} 0 & 0 & 1 \\ 0 & 1 & 0 \\ 1 & 0 & 0 \end{pmatrix}} \begin{pmatrix} R \\ G \\ B \end{pmatrix}$$

FIG.8F $$\begin{pmatrix} B \\ R \\ G \end{pmatrix} = \overset{V6}{\begin{pmatrix} 0 & 0 & 1 \\ 1 & 0 & 0 \\ 0 & 1 & 0 \end{pmatrix}} \begin{pmatrix} R \\ G \\ B \end{pmatrix}$$

FIG.10 lookup tables 404 combined matrix C (color mode)
lookup table 404(a)

| matrix | memory | | address |
|---|---|---|---|
| C1 | R1 | $K_{11}$ | 0 H |
| | | $K_{21}$ | 1 H |
| | | $K_{31}$ | 2 H |
| | G1 | $K_{12}$ | 3 H |
| | | $K_{22}$ | 4 H |
| | | $K_{32}$ | 5 H |
| | B1 | $K_{13}$ | 6 H |
| | | $K_{23}$ | 7 H |
| | | $K_{33}$ | 8 H |
| | | . | . |
| C2 | R2 | . | . |
| . | . | . | . | combined matrix D (monotone mode) lookup table 404(b)

| matrix | memory | | address |
|---|---|---|---|
| D1 | R1 | $M_{11}$ | 0 H |
| | | $M_{21}$ | 1 H |
| | | $M_{31}$ | 2 H |
| | G1 | $M_{12}$ | 3 H |
| | | $M_{22}$ | 4 H |
| | | $M_{32}$ | 5 H |
| | B1 | $M_{13}$ | 6 H |
| | | $M_{23}$ | 7 H |
| | | $M_{33}$ | 8 H |
| | | . | . |
| D2 | R2 | . | . |
| . | . | . | . |

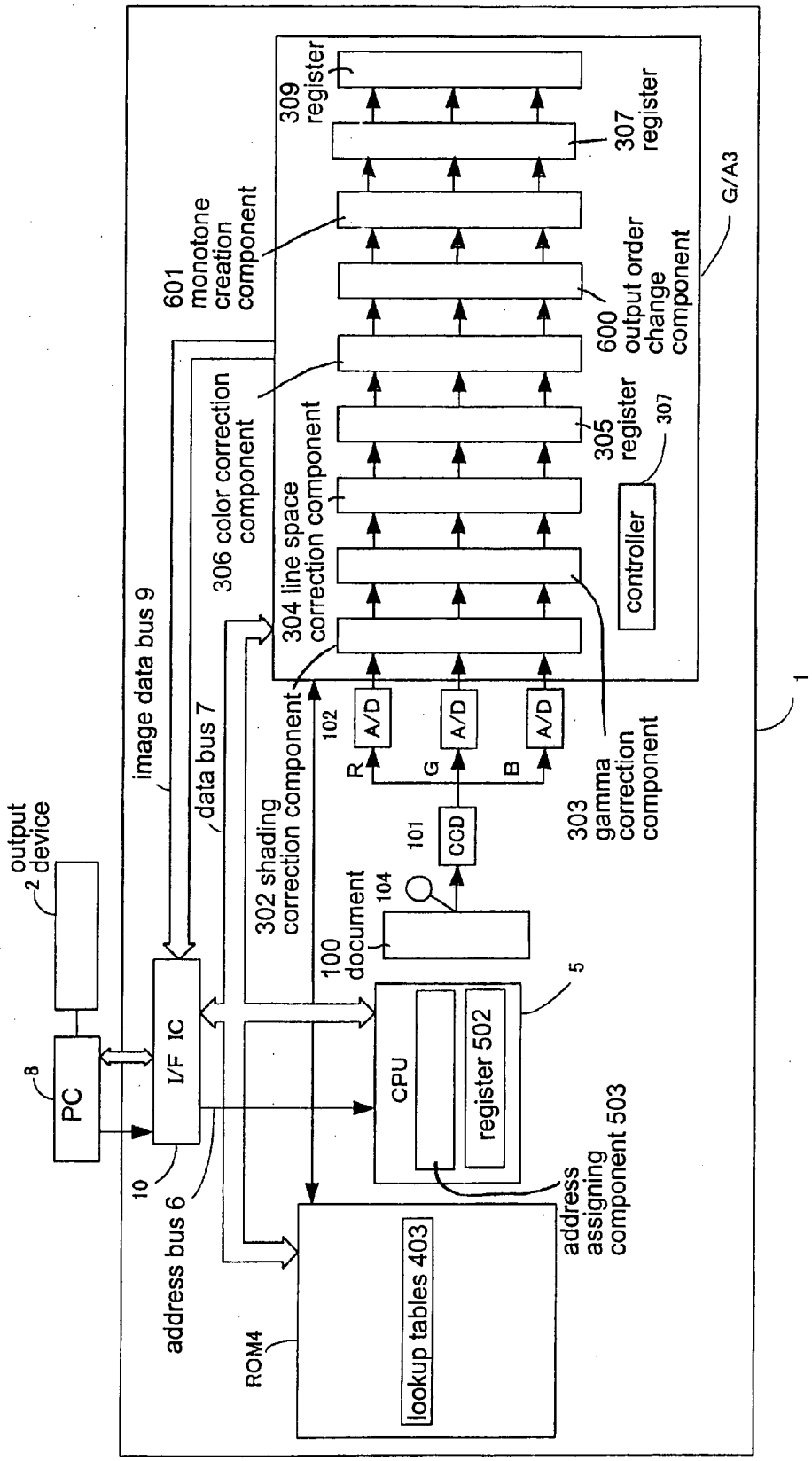
PRIOR ART FIG.11

IMAGE PROCESSING, IMAGE READING APPARATUS AND IMAGE PROCESSING METHOD

BACKGROUND OF THE INVENTION

1. Field of the Invention

The present invention relates to an image processing apparatus, which applies color correction processing to original image data read by a photoelectric conversion device in an image scanner, facsimile machine, digital copier, and the like, and outputs it to a display device such as CRT, a printer device, or other output devices.

2. Prior Art

Generally, an image processing apparatus applies color correction processing to image data read by a photoelectric conversion device for each of colors, for example the three primary colors, i.e. RGB (red, green, and blue), and outputs the image data after correction to a display device such as a CRT or an output device such as a printer. A computer performs this correction with correction values according to characteristics of the output device so that a most faithful image to the original is obtained.

Meanwhile, for outputting the image data, it needs to be output in the order of the color constituents according to output information from the application software of the computer, and the like. That is, for image information that is read in the order of RGB, the output order of the RGB must be consistent with the reading format of the application software, for example TIFF, BMP, JPEG, and the like.

A conventional image reading apparatus is shown in FIG. 11. In the past, in this kind of image reading apparatus, a light source 104 irradiates a document 100, and the reflected light is separated into the three primary colors (constituents) of R, G, and B by passing through respective filters of R (red), G (green), and B (blue). They are incident to a photoelectric conversion element CCD 101, for example such as a CCD. The light (analog data) of each color constituent incident to the CCD 101 is input respectively into an A/D converter (analog to digital converter) 102 and digitized.

Data of digitized R, G, and B is corrected respectively in a shading correction component 302, a gamma correction component 303, and a line space correction component 304, and is temporarily stored in a regisLer 305, then it is input into a matrix operation circuit of a color correction component 306. In the shading correction component 302, shading correction processing, which corrects non-uniformity of the light intensity of the light source and irregularity of the sensitivity of the CCD image elements, is applied. In the gamma correction component 303, gamma correction processing, which corrects resolution of the respective R, G, and B data such that the output data resolution matches the resolution of the input data, is applied. In the line space correction component 304, line space correction processing, which adjusts shifting of the CCD read positions for R, G, and B, is applied.

Also, in the matrix operation circuit 306 of the color correction component, color correction processing such as a matrix operation shown below is performed using correction values for each color.

Color Correction Matrix A $$\begin{pmatrix} R' \\ G' \\ B' \end{pmatrix} = \begin{bmatrix} K_{11} & K_{12} & K_{13} \\ K_{21} & K_{22} & K_{23} \\ K_{31} & K_{32} & K_{33} \end{bmatrix} \begin{bmatrix} R \\ G \\ B \end{bmatrix}$$

An original image and an output image have different characteristics in color, density, and the like, because of errors in filters that separate the colors into the three primary colors, spectral sensitivity characteristics of the CCD, and image generation characteristics of each output device (for example, printer, CRT, and the like). Thus, the image data from the CCD must be corrected by correction values. Generally, correction values R', G', and B' are obtained by a matrix operation, which operates on input image data using a color correction matrix A. A method of this matrix operation is disclosed in Japanese Patent Publication (KOKAI) No. H5-122455.

Specifically, as shown in FIG. 11, the color correction matrix A specified according to the output device from color correction matrices stored in lookup tables 403 is temporarily stored in register 502. This color correction matrix A and the image data of R, G, and B are input into the matrix operation circuit 306, and color correction processing is performed electronically by matrix operations. Also, the image data corrected in this manner is transferred to a computer (PC 8) via an image data bus 9 and an I/F IC, and is output to an output device via an image handling application software, or is directly output to an output component like a facsimile or a digital copy machine, or the like.

At this time, the order of processing of each color constituent in the output device depends on specifications of an image processing software in the PC, or a printer engine of a facsimile or a digital copy machine. Thus, an order of each color constituent read by CCD needs to match to an order for image processing.

Conventionally, final data after color correction is converted to an order of color constituents according to an output device by a switching circuit (an output order changing component 600) provided in an output interface component. The output order changing component 600 comprises an output order changing circuit that changes (switches) an output order based on each output device, and this output order changing component 600 requires a switching controller device.

Accordingly, the apparatus and methods of the prior art require special electrical devices for changing the output order such as a switching circuit, and its controller, as well as a memory for switching, and the like. The apparatus tends to be complex and large, and furthermore it takes longer processing time.

OBJECTS OF THE INVENTION

The first object of the present invention is to provide an image processing apparatus, in which image data after correction is consistent with the order of the color constituents of each output apparatus without requiring electrical devices such as special switching circuits. Reduction in size and simplification of the processing circuits are possible for an image processing apparatus as well as an image reading apparatus that uses this.

The second object of the present invention is to provide an image processing method that does not require electrical circuits such as special switching circuits.

Furthermore, the present invention aims also to provide an image processing apparatus comprising a color mode and a monotone mode. A switching circuit for changing an order of image output data, a monotone processing circuit for creating monotone images, and a color correction operation circuit during the color mode can be consolidated.

SUMMARY OF THE INVENTION

To achieve the objects described above, the present invention provides the following apparatus and method. First, an image processing apparatus comprises input image data storing means that stores input image data of two or more color constituents; first correction value storing means that stores correction values for correcting the input image data of each color constituent; data order setting means that stores the correction value data from the first correction value storing means into second correction value storing means according to a command that specifies an output order of the color constituents; correction operation means that sequentially corrects the input image data from the input image data storing means for each color constituent based on the correction values from the second correction value storing means; and output image data storing means that stores and then outputs the corrected image data from the correction operation means.

In the present invention, the output order of image data can be changed arbitrarily by setting the order of correction value data for color correction based on an external command. As a result, a switching circuit, a controller and memory are not required.

The data order setting means includes operation means that resorts the data order of the correction value data from the first correction value storing means; address assigning means provided between the first correction value storing means and the second correction value storing means; and memory means that stores correction values corresponding to a command that specifies the output order of the color constituents. The data order setting means is correction value specifying means that selects a single correction value from the above memory means.

Also, the present invention provides an image processing method, comprising, an image data generation step in which image data read for each of two or more color constituents is stored in input image data storing means; a correction value storing step in which correction values data for correcting the input image data for each color constituent is stored in advance in correction value storing means; a correction operation step in which the input image data read from the input image data storing means is operated on based on the correction value data read from the correction value storing means for each color constituent; and a data output step in which the image data after correction which was obtained from this correction operation step is output. The above correction value storing step includes data order setting means that changes the order of the correction value data according to a command that specifies the output order of the above color constituents.

Furthermore, the present invention provides an apparatus that can perform both color correction and monotone image creation in an image processing apparatus with a color mode and a monotone mode. The processing circuits can be simplified without requiring a special circuit for monotone image creation by executing color correction in the color mode by each of the means, and performing the operations for monotone image creation using the operation circuit for color correction in the monotone mode in which monotone image data is generated by mixing color constituents data of a color image.

Specifically, the color correction circuit has a matrix operation circuit for the color mode, and stores correction values for the monotone mode in a matrix operation format in advance.

BRIEF EXPLANATION OF THE DRAWINGS

FIG. 2 is a drawing showing a lookup table in which color correction matrices are stored;

FIG. 3 is a drawing showing a register 502 of the first embodiment in which the color correction matrices are stored;

FIG. 7 is a drawing showing respective lookup tables of the second embodiment in which respective correction matrices are stored;

FIGS. 8A to 8F are equations of output order change matrices V1–V6 for changing an output order of image data;

FIG. 10 is a drawing showing the respective lookup tables of the third embodiment in which respective correction matrices (combined matrices C, D) are stored; and FIG. 11 is a block diagram showing a structure of the image reading apparatus of prior art.

PREFERRED EMBODIMENTS OF THE INVENTION

FIRST EMBODIMENT

Figure 1:
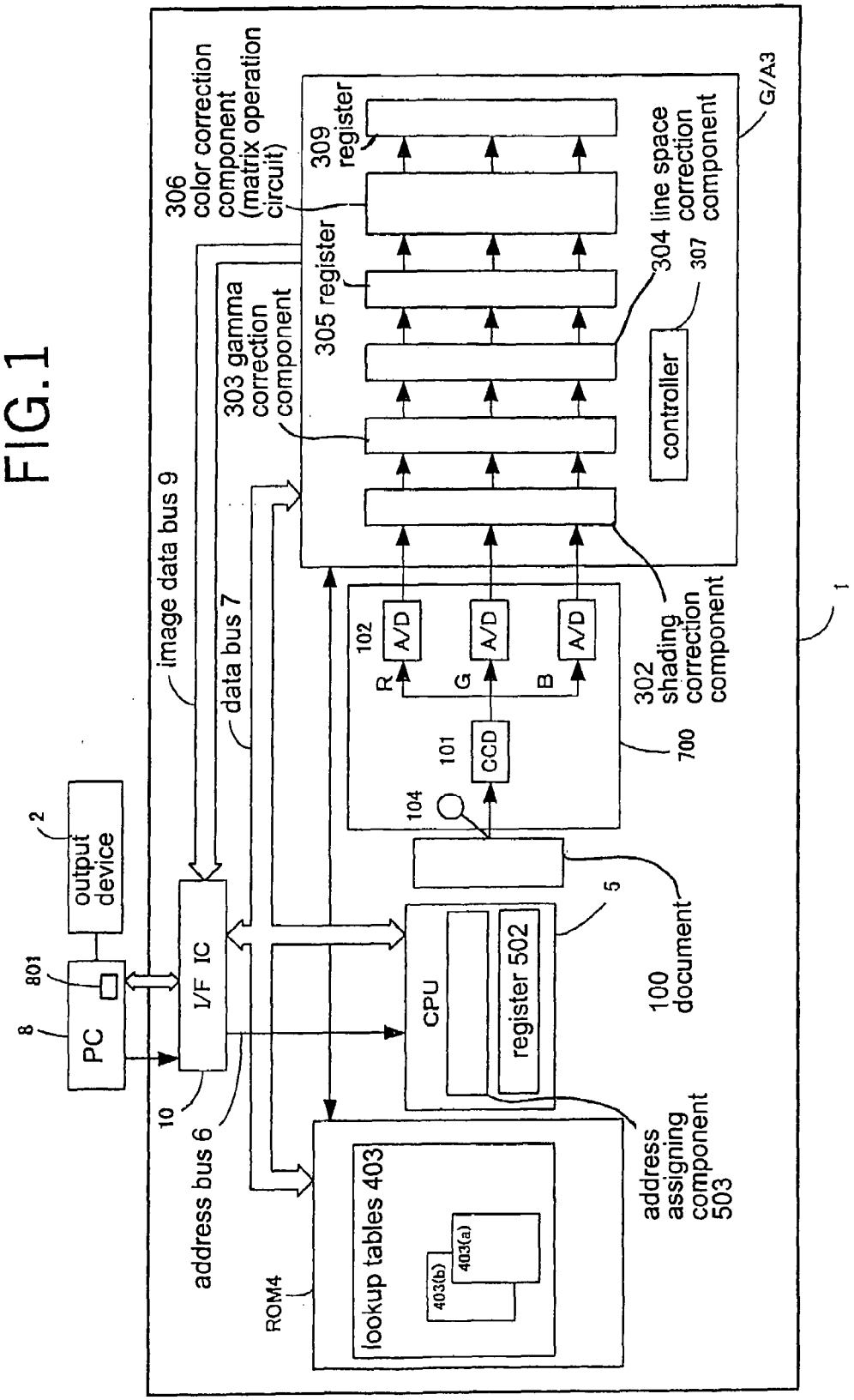
FIG. 1 is a block diagram showing a structure of an image reading apparatus of a first embodiment.
Figure 4:
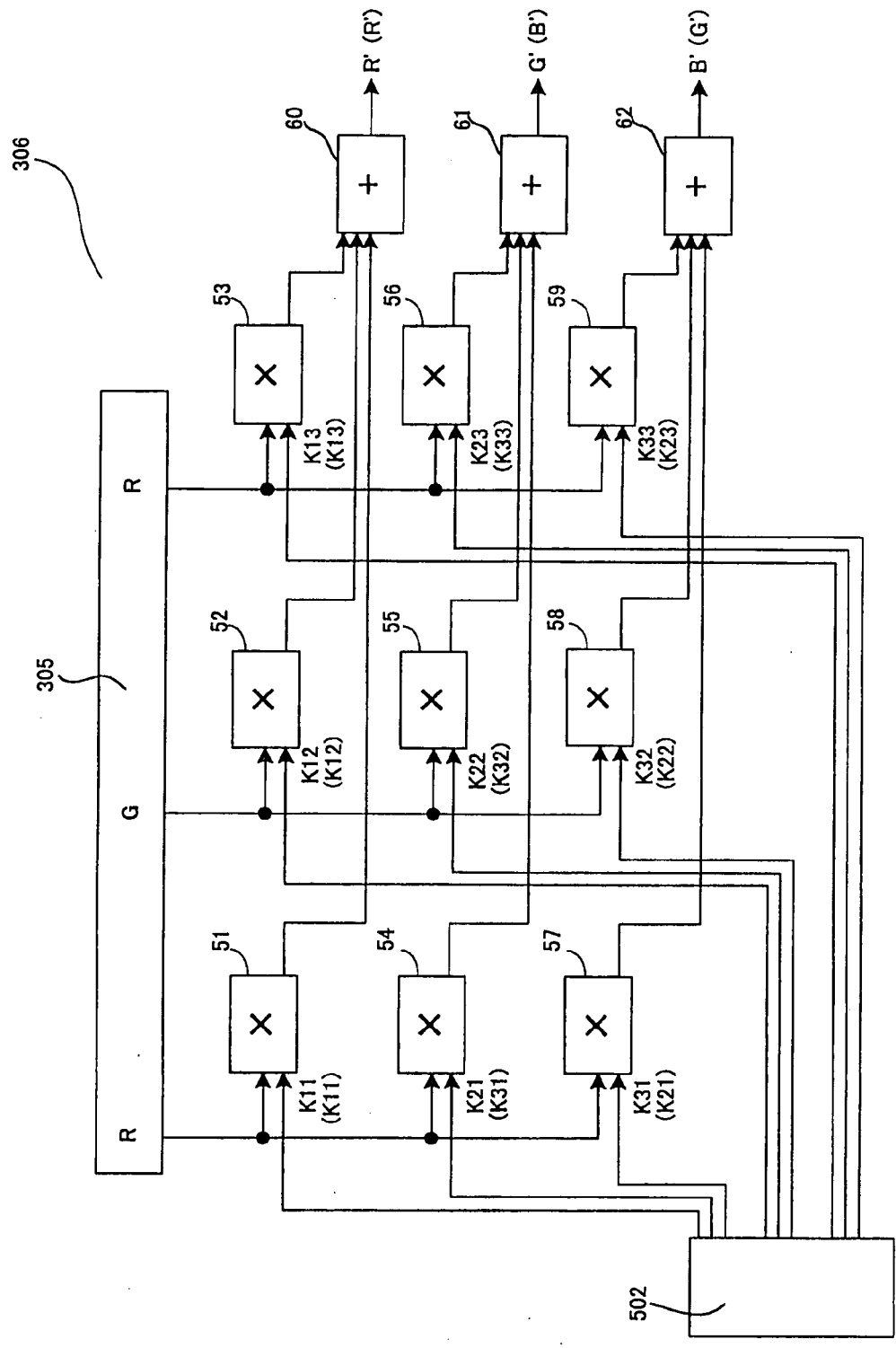
FIG. 4 is a circuit drawing showing a structure of a color correction component (matrix operation circuit) of the first embodiment.
Figure 5:
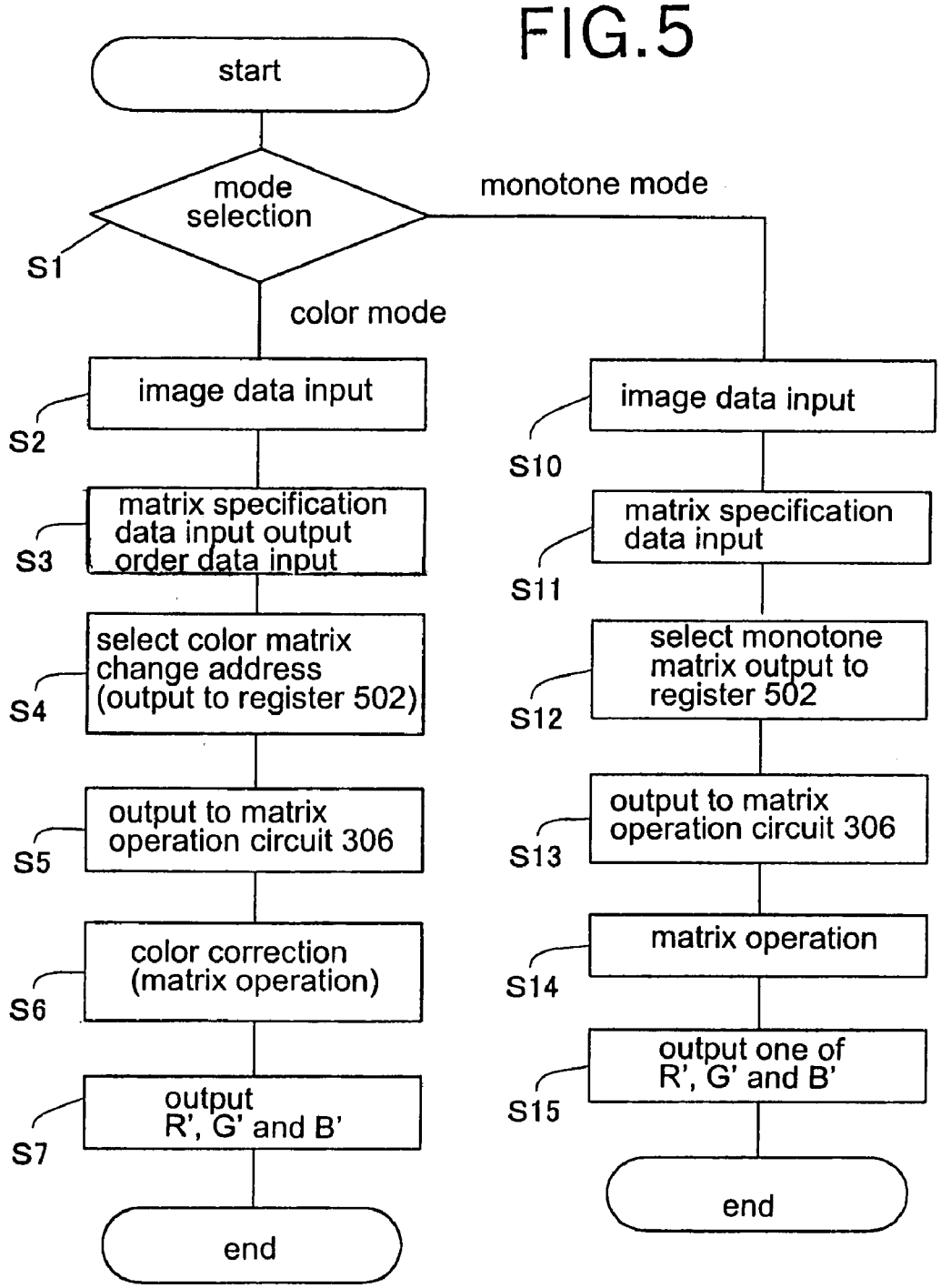
FIG. 5 is a flow chart showing an operation of the first embodiment.

The present invention provides an apparatus and image processing methods that apply color correction processing to color image data and output the corrected image data to various output devices, such as compact, general-purpose computers (PC) and unit printers, and the like. The present invention can be applied to image scanners, facsimile machines, digital cameras, and the like. As an embodiment, FIG. 1 shows a block diagram of a color image reading apparatus 1 that outputs image data to an output device via a compact, general-purpose personal computer (PC). FIG. 2 shows an outline of a lookup table in which color correction matrices are stored. FIG. 3 shows an outline of the register in which the color correction matrices are stored. FIG. 4 shows a color correction component (matrix operation circuit). FIG. 5 is a flow chart showing an operation of the color image reading apparatus.

As shown in FIG. 1, the color image reading apparatus 1 is connected to a PC 8 that has an output device 2, and has an I/F IC 10 that performs timing control of transmission and receipt of data with the PC 8. Also, the color image reading apparatus 1 has a color mode that outputs image data in color, and a monotone mode that outputs image data in monotone. Selection of these modes is performed by an operation component 801 (image processing mode selection means) in the PC 8. The mode signal selected by the operation component 801 is transmitted and received via the I/F IC 10. Furthermore, the color image reading apparatus 1 has an image reading component that is constituted of a light source 103 that irradiates a document 100, a line image sensor CCD 101 as a photoelectric conversion element, and an A/D converter 102 that converts the analog data from the CCD 101 into digital data. The CCD 101 photo-electrically converts the reflected light from the document 100 through an optical system to electrical signal according to each of the color constituents R, G, and B. Furthermore, a gate array (G/A) 3 comprises processing circuits, and the like, which apply various processing to the image data from the A/D converter 102, a ROM 4 that stores color correction matrices, and a CPU 5.

As shown in FIG. 2, lookup tables 403 (first correction value storing means) are stored in the ROM 4, and the lookup tables 403 are constituted by a color lookup table 403(a) and a monotone lookup table 403(b).

The color lookup table 403(a) stores color correction matrices A (A1, A2 . . . ), which are color correction values correspond to image characteristics of various output devices (a CRT of a computer (PC), a ink jet printer, or a laser printer) in each specified address. A color correction matrix A is a 3×3 matrix, and constituted by coefficients (correction value data) that determine a mixture ratio of each color constituent. For example, in the case of the color correction matrix A1 as shown below, it is constituted by nine coefficients from $K_{11}$ to $K_{33}$, where $K_{11}$, $K_{21}$, and $K_{31}$ correspond to R, $K_{12}$, $K_{22}$, and $K_{32}$ correspond to G, and $K_{13}$, $K_{23}$, and $K_{33}$ correspond to B, respectively.

$$A1 = \begin{bmatrix} K_{11} & K_{12} & K_{13} \\ K_{21} & K_{22} & K_{23} \\ K_{31} & K_{32} & K_{33} \end{bmatrix}$$

In the monotone lookup table 403(b), monotone matrices Y (Y1, Y2 . . . ), which convert from color image data to monotone image data and perform color correction as well, are stored in specified addresses. Monotone image data with good reproduction can be obtained by mixing each of the color constituents R, G, and B in a specified ratio (by weighting). Thus, a matrix operation using a monotone image matrix Y with specific mixture ratios of each color constituent as coefficients is performed.

$$Y$$
$$\begin{pmatrix} R' \\ G' \\ B' \end{pmatrix} = \begin{bmatrix} N_{11} & N_{12} & N_{13} \\ N_{21} & N_{22} & N_{23} \\ N_{31} & N_{32} & N_{33} \end{bmatrix} \begin{bmatrix} R \\ G \\ B \end{bmatrix}$$

The monotone image matrix Y calculates R', G', and B' as a mixture of each color constituent, and one of R', G' and B' is selected and used as monotone image data. Accordingly, the monotone matrix Y is constituted by coefficients that determine the mixture ratio of each color constituent.

The CPU 5 has a register 502 (second correction value storing means) that temporarily stores a matrix output from the lookup tables 403 and an address assigning component (address assigning means) 503. The address assigning means 503 assigns addresses when performing input and output of color correction matrices between the lookup tables 403, the register 502, and the color correction circuit 306. The register 502, as shown in FIG. 3, temporarily stores nine data in the respective addresses from 0H to 8H, and each matrix output from the lookup tables 403 in the addresses 0H–9H. The register 502 then outputs to the matrix operation circuit of the color correction component 306.

As shown in FIG. 1, the gate array 3 comprises a shading correction component 302, a gamma correction component 303, a line space correction component 304, a register 305 (input image data storing means), a matrix operation circuit 306 (correction operation means), a register 309 (output image data storing means) and a controller 307. The shading correction component 302 applies shading correction to image data that was digitally converted via the CCD 101 and the A/D converter 102, to rectify the image data by eliminating non-uniformity of light intensity of the light source and irregularity of sensitivity of each image element of the CCD, and the like. The gamma correction component 303 applies gamma correction to correct each level of R, G, and B image data such that the output levels are directly proportional to the levels of the input image data. The line space correction component 304 corrects shifting of the read positions of R, G, and B among the various CCD line image sensor sensors CCD 101. The register 305 (input image data storing means) includes a circuit for temporally storing the image data after the line space correction. The matrix operation circuit 306 (correction operation means) applies color correction processing to the image data from the register 305. The register 309 (output image data storing means) includes a circuit for temporally storing the image data after the color correction. The controller 307 controls timing of each color processing.

The matrix operation circuit of the color correction component 306, as shown in FIG. 4, is constituted by nine multiplication circuits 51–59 and three addition circuits 60–62, and they perform matrix operations using the matrix output from the register 502 and the image data output from the register 305, and compute the image data R', G', and B'.

Specifically, when using the color correction matrix 1 (shown below) stored in the register 502 to perform the matrix operation (shown below), as shown in FIG. 3 and FIG. 4, the coefficient $K_{11}$ stored in the address 0H in the register 502 is input into the multiplication circuit 51. Likewise, the coefficient $K_{12}$ stored in the address 3H in the register 502 is input into the multiplication circuit 52, and the coefficient $K_{13}$ stored in the address 6H in the register 502 is input into the multiplication circuit 53. After multiplications $K_{11}*R$, $K_{12}*G$, and $K_{13}*B$ are performed respectively, the result is added by the addition circuit 60, and R' is output. G' and B' are computed in the same manner. All computed data are temporarily stored in the register 309, and then output in the order of R', G', and B' to the output device 2 via the PC 8.

$$A1 = \begin{bmatrix} K_{11} & K_{12} & K_{13} \\ K_{21} & K_{22} & K_{23} \\ K_{31} & K_{32} & K_{33} \end{bmatrix}$$

-continued

A1

$$\begin{pmatrix} R' \\ G' \\ B' \end{pmatrix} = \begin{bmatrix} K_{11} & K_{12} & K_{13} \\ K_{21} & K_{22} & K_{23} \\ K_{31} & K_{32} & K_{33} \end{bmatrix} \begin{bmatrix} R \\ G \\ B \end{bmatrix}$$

Next, an operation of the image reading apparatus 1 is explained using a flow chart shown in FIG. 5.

First, as shown in FIG. 1, the color mode is selected using the operation component 801 of the PC 8 (Step S1).

Next, the reflected light from the document 100 irradiated by the light source 104 is separated into each of the color constituents R, G, and B by color filters, and is incident on the CCD 101. The light (analog data) incident on the CCD 101 is converted into digital data by the A/D converter 102. After processed by the shading correction component 302, the gamma correction component 303, and the line space correction component 304, the digital data is stored in the register 305 (Step S2).

The CPU 5 receives matrix specification data, which specifies the color correction matrices corresponding to the output device 2, and output order data, which specifies the output order of R, G, and B, from the PC 8 (Step S3). Following these specification data, the address assigning component 503 selects from the lookup table 403(*a*) the color correction matrix A which corresponds to the output device 2, for example the color correction matrix A1, and outputs to an assigned address in the register 502 (Step S4).

For example, when the output order data is in the order of R, B, and G, the address specifying component 402 changes the address of each coefficient. As shown as brackets in FIG. 3, each of the coefficients $K_{11}$, $K_{12}$, and $K_{13}$ in the addresses 0H, 3H, and 6H in the lookup tables 403 is output to the addresses 0H, 3H, and 6H in the register 502. Likewise, each of the coefficients $K_{21}$, $K_{22}$, and $K_{23}$ in the addresses 1H, 4H, and 7H in the lookup tables 403 is output to the addresses 2H, 5H, 8H in the register 502, and each of the coefficients $K_{31}$, $K_{32}$, and $K_{33}$ in the addresses 2H, 5H, and 7H is output to the addresses 1H, 4H, and 7H in the register 502. Through this process, as shown below, the second row and the third row in the color correction matrix 1 are exchanged, and the color correction matrix A' with the exchanged rows is stored in the register 502.

$$A1 = \begin{bmatrix} K_{11} & K_{12} & K_{13} \\ K_{21} & K_{22} & K_{23} \\ K_{31} & K_{32} & K_{33} \end{bmatrix} \xrightarrow[\text{row } 2 \to \text{row } 3]{\text{Row Exchange}} A1' = \begin{bmatrix} K_{11} & K_{12} & K_{13} \\ K_{31} & K_{32} & K_{33} \\ K_{21} & K_{22} & K_{23} \end{bmatrix}$$

The color correction matrix A' obtained in this manner can change the mixture ratio of each image data in the color correction processing as well as the output order.

Next, the color correction processing is performed in the color correction component 306 using the color correction matrix A1' in the register 502.

The image data R, G, and B stored in the register 305 after color corrections and the color correction matrix A' stored in the register 308 are input into the matrix operation circuit of the color correction component 306 (Step S5), and the matrix operation of the color correction processing is performed (Step S6).

A1'

$$\begin{pmatrix} R' \\ G' \\ B' \end{pmatrix} = \begin{bmatrix} K_{11} & K_{12} & K_{13} \\ K_{31} & K_{32} & K_{33} \\ K_{21} & K_{22} & K_{23} \end{bmatrix} \begin{bmatrix} R \\ G \\ B \end{bmatrix}$$

Specifically, as shown in FIG. 3 and FIG. 4, the coefficient ($K_{11}$) stored in the address 0H in the register 502 is input into the multiplication circuit 51. Likewise, the coefficient ($K_{12}$) stored in the address 3H in the register 502 is input into the multiplication circuit 52, and the coefficient ($K_{13}$) stored in the address 6H in the register 502 is input into the multiplication circuit 53. Then, the multiplications $(K_{11})*R$, $(K_{12})*G$, and $(K_{13})*B$ are performed respectively by multiplication circuits 51, 52 and 53, and (R') is obtained by adding the results in the addition circuit 60. (B') and (G') are obtained in the same manner. The results are temporarily stored in the register 309, and then they are output in the order of (R'), (B'), and (G') to the output device 2 via the PC 8 (Step S7).

Next, the case of the monotone mode is explained.

First, as shown in FIG. 1, the monotone mode is selected using the operation component 801 of the PC 8 (Step S1).

Next, similar to the color mode, the reflected light from the document 100 irradiated by the light source 104 is separated into each of the color constituents R, G, and B by color filters, and is incident on the CCD 101. The light (analog data) incident on the CCD 101 is converted into digital data by the A/D converter 102. After processed by the shading correction component 302, the gamma correction component 303, and the line space correction component 304, the digital data is stored in the register 305 (Step S10).

Next, the CPU 5 receives matrix specification data, which specifies a monotone matrix corresponding to the output device 2, from the PC 8 (Step S11). Also, following this matrix specification data, the address assigning component 503 selects one monotone matrix Y (for example, Y1) from the monotone lookup table 403(*b*), and outputs to the register 502 (Step S12).

This output is not illustrated, but respective constituents $N_{11}$–$N_{13}$ stored in the addresses 0H to 8H in the lookup table 403(*b*) are output to the addresses 0H to 8H in the register 502 in the same order that they are stored in the lookup table 403(*b*).

Next, the monotone matrix Y1 in the register 502 is output to the color correction component 306, and monotone image creation is performed by the color correction component 306.

The image data R, G, and B stored in the register 305 after color corrections and the monotone matrix Y stored in the register 308 are output to the matrix operation circuit of the color correction component 306 (Step S13). Then, the matrix operation is performed (Step S14).

Y1

$$\begin{pmatrix} R' \\ G' \\ B' \end{pmatrix} = \begin{bmatrix} N_{11} & N_{12} & N_{13} \\ N_{21} & N_{22} & N_{23} \\ N_{31} & N_{32} & N_{33} \end{bmatrix} \begin{bmatrix} R \\ G \\ B \end{bmatrix}$$

After being output to the register 309, and temporarily stored in the register 309, any one of R', G', and B' is output as monotone image data to the output device 2 via the PC 8 (Step S15).

Next, the image processing method applied to the image reading apparatus 1 is explained.

The image processing method, as explained using the flow chart in FIG. 5, comprises an image data generation step (Step S2), a correction value storing step (Steps 3 and 4), a correction operation step (Steps S5 and S6), and a data output step (Step S7). In the image data generation step (Step S2), the image data according to the three color constituents R, G, and B is stored in the register 305 as the input image data. In the correction value storing step (Steps S3 and S4), a color correction matrix A (for example, A1) is stored into the register 502 (the second correction value storing means) from the lookup table 403(a) (the first storing means) where the correction values data (color correction matrices A) for correcting the input image data for each color constituent is stored in advance, in an order based on the data from the PC 8 that specifies the output order of the color constituents R, G, and B. In the correction operation step (Steps S5, S6), the input image data read from the register 305 is operated based on the matrix Al read from the register 502 for each color constituent. In the data output step (Step S7), the image data R', G', and B' after correction obtained from the correction operation step are output.

As explained above, according to the present invention, in the case of the color mode, by selecting a color correction matrix according to the image characteristics of the output device, and furthermore changing the addresses of each coefficient in the color correction matrix to exchange the rows according to the order of processing of the output device, the mixture ratios of each color constituent in the color correction can be determined, and in addition, a matrix that determines the output order can be obtained. Also, by performing operations using the matrix, it becomes possible to perform the color correction, and at the same time to change the output order depending on various output devices without using a circuit to change the order of output. As a result, the circuit can be reduced in scale. Furthermore, in the prior art, changing of the output order is performed for each image element. On the other hand, in the present invention, it is accomplished just by one change of addresses (exchanging rows in a matrix) in the color correction matrix, and the processing time can be shortened.

In the case of the monotone mode, with the same operation circuit as the color correction processing of the color mode, the monotone image data can be obtained from the color image data without using a dedicated circuit for the monotone mode, and the circuit is reduced in scale.

In the present embodiment, the address change is performed when the color correction matrix is output from the lookup table to the register, however, the address change also may be performed when the color correction matrix is output from the register to the operation circuit.

SECOND EMBODIMENT

As for the second embodiment, the same components as in the first embodiment use the same symbols, and only the different places are explained.

Figure 6:
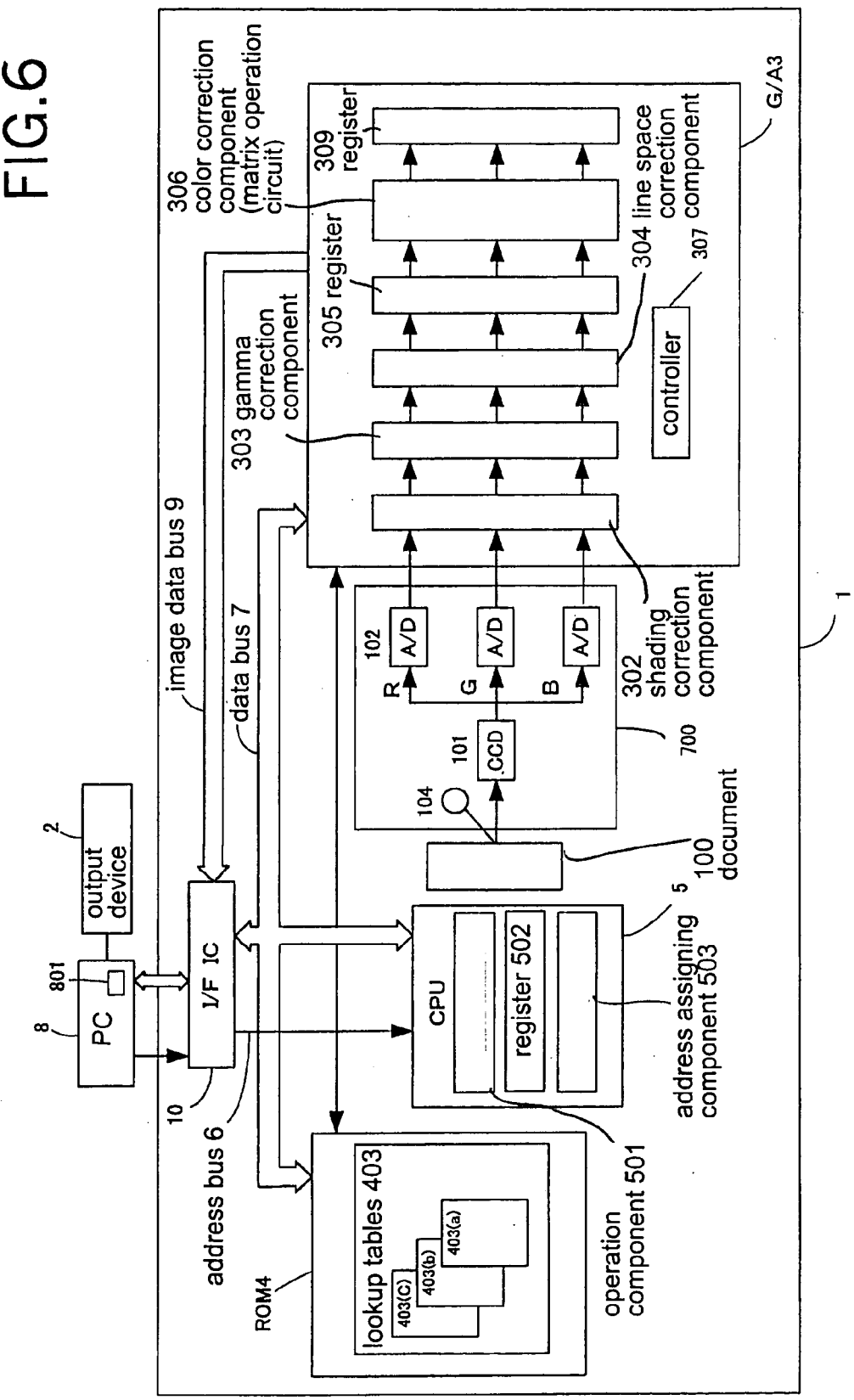
FIG. 6 is a block diagram showing a structure of an image reading apparatus of a second embodiment.

Just as in the first embodiment, FIG. 6 shows a block diagram of a color image reading apparatus of the second embodiment that outputs image data to an output device via a computer (PC). FIG. 7 shows the color correction matrices A (A1, A2 . . . ), the output order matrices V (V1, V2 . . . V6), and the monotone matrices Y (Y1, Y2 . . . ) stored in the respective lookup tables 403. FIGS. 8A to 8F show the changing matrices V1–V6 that change the output order of each color constituent according to the output order of the image data R, G, and B changed by matrix operations.

The image reading apparatus 1 has a color mode to output color image data in color and a monotone mode to output in monotone, and selection of these modes is performed by an operation component 801 (image processing mode selection means) in the PC 8. The mode signal selected by the operation component 801 is transmitted and received via the I/F IC 10 that controls the transmission and receipt timing of data with the PC 8.

Also, just as in the first embodiment, the color image reading apparatus 1 has an image reading component that is constituted of a light source 103 that irradiates a document 100, a line image sensor CCD 101 as a photoelectric conversion element, and an A/D converter 102 that converts the analog data from the CCD 101 into digital data. The CCD 101 photo-electrically converts the reflected light from the document 100 through an optical system to electrical signal according to each of the color constituents R, G, and B. Furthermore, a gate array (G/A) 3 comprises processing circuits, and the like, which apply various processing to the image data from the A/D converter 102, a ROM 4 that stores color correction matrices, and a CPU 5.

As shown in FIGS. 6 and 7, lookup tables 403 (first correction value storing means) are stored in the ROM 4, and lookup tables 403 are constituted by the color lookup table 403(a), an output order changing lookup table 403(b), and a monotone lookup table 403(c).

As shown in FIG. 7, the color lookup table 403(a) stores color correction matrices A (A1, A . . . ), which are color correction values correspond to image characteristics of various output devices in each specified address. A color correction matrix A is a 3×3 matrix, and constituted by coefficients (correction value data) that determine a mixture ratio of each color constituent. For example, in the case of the color correction matrix 1 as shown below, it is constituted by nine coefficients from $K_{11}$ to $K_{33}$, where $K_{11}$, $K_{21}$, and $K_{31}$ correspond to R, $K_{12}$, $K_{22}$, and $K_{32}$ correspond to G, and $K_{13}$, $K_{23}$, and $K_{33}$ correspond to B, respectively.

In the output order lookup table 403(b), six output order changing matrices V (V1 to V6), shown in FIGS. 8A to 8F, for changing the output order of image data, are stored in the specified addresses. Each of these output order changing matrices V1 to V6 is a 3×3 matrix, and each row and column are constituted by one "1" and two "0"s. For example, when matrix operation is performed using the output order changing matrix V2 shown in FIG. 8B and the image data "R, G, B", the output order is changed from "R, G, B" to "R, B, G" (the second and third row are exchanged). This image reading apparatus 1 has six output order changing matrices based on the combinations of series of R, G, and B, such that it can respond to any output orders, but one also may select from among the six according to need.

In the monotone lookup table 403(c), monotone matrices Y (Y1, Y2 . . . ), which convert from color image data to monotone image data, are stored in specified addresses. As described in the first embodiment, monotone image data with good reproduction can be obtained by mixing each of the color constituents R, G, and B in a specified ratio (by weighting). Thus, a matrix operation using a monotone image matrix Y with specific mixture ratios of each color constituent as coefficients is performed.

$$\begin{pmatrix} R' \\ G' \\ B' \end{pmatrix} = \begin{bmatrix} N_{11} & N_{12} & N_{13} \\ N_{21} & N_{22} & N_{23} \\ N_{31} & N_{32} & N_{33} \end{bmatrix} \begin{bmatrix} R \\ G \\ B \end{bmatrix}$$

The monotone image matrix Y calculates R', G', and B' as a mixture of each color constituent, and one of R', G' and B' is selected and used as monotone image data. Accordingly, the monotone matrix Y is constituted by coefficients that determine the mixture ratio of each color constituent.

The CPU 5, as is described later, comprises an operation component 501 (data order operation means) of a matrix operation circuit, a register 502 (second correction value storing means) that temporarily stores the result of this operation, and an address assigning component 503 that assigns an address when selecting a matrix from the lookup table 403. The operation component 501 (data order operation means) performs an operation of multiplying the color correction matrix A and the output order changing matrix V in color mode, and performs an operation of multiplying the color correction matrix A and the monotone matrix Y in monotone mode. The register 502, as shown in FIG. 3 explained in the first embodiment, temporarily stores nine data in the respective addresses from 0H to 8H, and each matrix output from the lookup tables 403 in the addresses 0H–9H. The register 502 then outputs to the matrix operation circuit of the color correction component 306.

The color correction component 306 (correction operation means), as shown in FIG. 4 explained in the first embodiment, has a color correction matrix operation circuit that consists of nine multiplication circuits and three addition circuits.

Next, an operation of the image reading apparatus 1 of the above constitution is explained.

As shown in FIG. 6, first, either one of the color mode or the monotone mode is selected using the operation component 801 of the PC 8.

Same as in the first embodiment, the light (analog data) reflected from the document 100 and separated to the respective color constituents R, G, and B passes through the CCD 101, the A/D converter 102, the shading correction component 302, the gamma correction component 303, and the line space correction component 304. The image data then is temporarily stored in the register 305 (input image data storing means).

In the case of the color mode, the CPU 5 receives the data specifying the color correction matrix corresponding to the image characteristics of the output device 2, and the output order data indicating the output order of R, G, and B, from the PC 8. One color correction matrix A (for example, A1) corresponding to the output device 2 is selected from the color correction lookup table 403(*a*) according to these data and the address assigning component 503. One output order changing matrix V (for example, V2) is selected according to the output order data from the output order lookup table 403(*b*), and they are output to the operation component 501.

In the operation component 501, the matrix operation shown below is performed. Through this operation, the color correction matrix 1 is subjected to row exchange (resorting of the data order). Also, a combined matrix C for determining the mixture ratio of each color constituent in color correction processing and for changing the output order is obtained. The results are output to the register 502.

Combined Matrix C      V2            A1
$$\begin{pmatrix} K_{11} & K_{12} & K_{13} \\ K_{31} & K_{32} & K_{33} \\ K_{21} & K_{22} & K_{23} \end{pmatrix} = \begin{bmatrix} 1 & 0 & 0 \\ 0 & 0 & 1 \\ 0 & 1 & 0 \end{bmatrix} \begin{bmatrix} K_{11} & K_{12} & K_{13} \\ K_{21} & K_{22} & K_{23} \\ K_{31} & K_{32} & K_{33} \end{bmatrix}$$

Next, in the color correction component 306, using the combined matrix C output from the register 502 and the image data R, G, and B output from the register 305, the matrix operation shown below is performed. The color corrected image data R', B', and G' is temporarily stored in the register 309 (output image data storing means), and then it is output in this order to the output device 2 via the PC 8.

Combined Matrix C
$$\begin{pmatrix} R' \\ G' \\ B' \end{pmatrix} = \begin{bmatrix} K_{11} & K_{12} & K_{13} \\ K_{21} & K_{22} & K_{23} \\ K_{31} & K_{32} & K_{33} \end{bmatrix} \begin{bmatrix} R \\ G \\ B \end{bmatrix}$$

Next, the monotone mode is explained.

In the case of the monotone mode, the CPU 5 receives the data specifying the color correction matrix corresponding to the output device 2 and the data specifying the monotone matrix from the PC 8. One color correction matrix A (for example, A1) corresponding to the output device 2 is selected from the color correction lookup table 403(*a*) according to these data and the address assigning component 503. One monotone matrix Y (for example, Y1) is selected according to the output device 2 from the output order lookup table 403(*c*), and they are output to the operation component 501.

In the operation component 501, the operation shown below is performed. A combined matrix D with a function of determining the mixture ratio of each color in color correction processing and determining the mixture ratio of each color constituent in monotone processing is obtained, and it is output to the register 502.

Combined Matrix D           Y1              A1
$$\begin{pmatrix} M_{11} & M_{12} & M_{13} \\ M_{21} & M_{22} & M_{23} \\ M_{31} & M_{32} & M_{33} \end{pmatrix} = \begin{bmatrix} N_{11} & N_{12} & N_{13} \\ N_{21} & N_{22} & N_{23} \\ N_{31} & N_{32} & N_{33} \end{bmatrix} \begin{bmatrix} K_{11} & K_{12} & K_{13} \\ K_{21} & K_{22} & K_{23} \\ K_{31} & K_{32} & K_{33} \end{bmatrix}$$

Next, in the color correction component 306, using the combined matrix D output from the register 502 and the image data R, G, and B output from the register 305, the matrix operation shown below is performed. The color corrected image data R', B' and G' is temporarily stored in the register 309, and then any one of R', B' and G' is output to the output device 2 via the PC 8 as monotone image data.

Combined Matrix D
$$\begin{pmatrix} R' \\ G' \\ B' \end{pmatrix} = \begin{bmatrix} K_{11} & K_{12} & K_{13} \\ K_{21} & K_{22} & K_{23} \\ K_{31} & K_{32} & K_{33} \end{bmatrix} \begin{bmatrix} R \\ G \\ B \end{bmatrix}$$

As explained above, according to the present invention, matrix operations are performed with a color correction matrix and an output order matrix corresponding to an output device in the color mode, or with a color correction matrix and a monotone matrix corresponding to an output device in the monotone mode. A combined matrix that determines the mixture ratio of each color constituent in color correction and changes the output order can be obtained. Additionally, a combined matrix that determines the mixture ratio of each color constituent in color correction and the mixture ratio of each color constituent in monotone image creation can be obtained. Also, by performing operations with the color correction matrix operation circuit using each combined matrix and image data, in the case of the color mode, it becomes possible to perform color correction and output the image data in the specified output order. In the case of the monotone mode, it becomes possible to perform color correction and perform processing without using a dedicated circuit for monotone image creation, and the circuit could be reduced in scale. Furthermore, in the prior art, changing of the output order is performed for each image element, but in the present invention, by using combined matrices, there is no need to perform changing operation of the output order for each pixel, and the processing time can be shortened.

THIRD EMBODIMENT

The third embodiment will be explained using the same symbols used for the same components as in the first embodiment, and only different aspects are explained.

Figure 9:
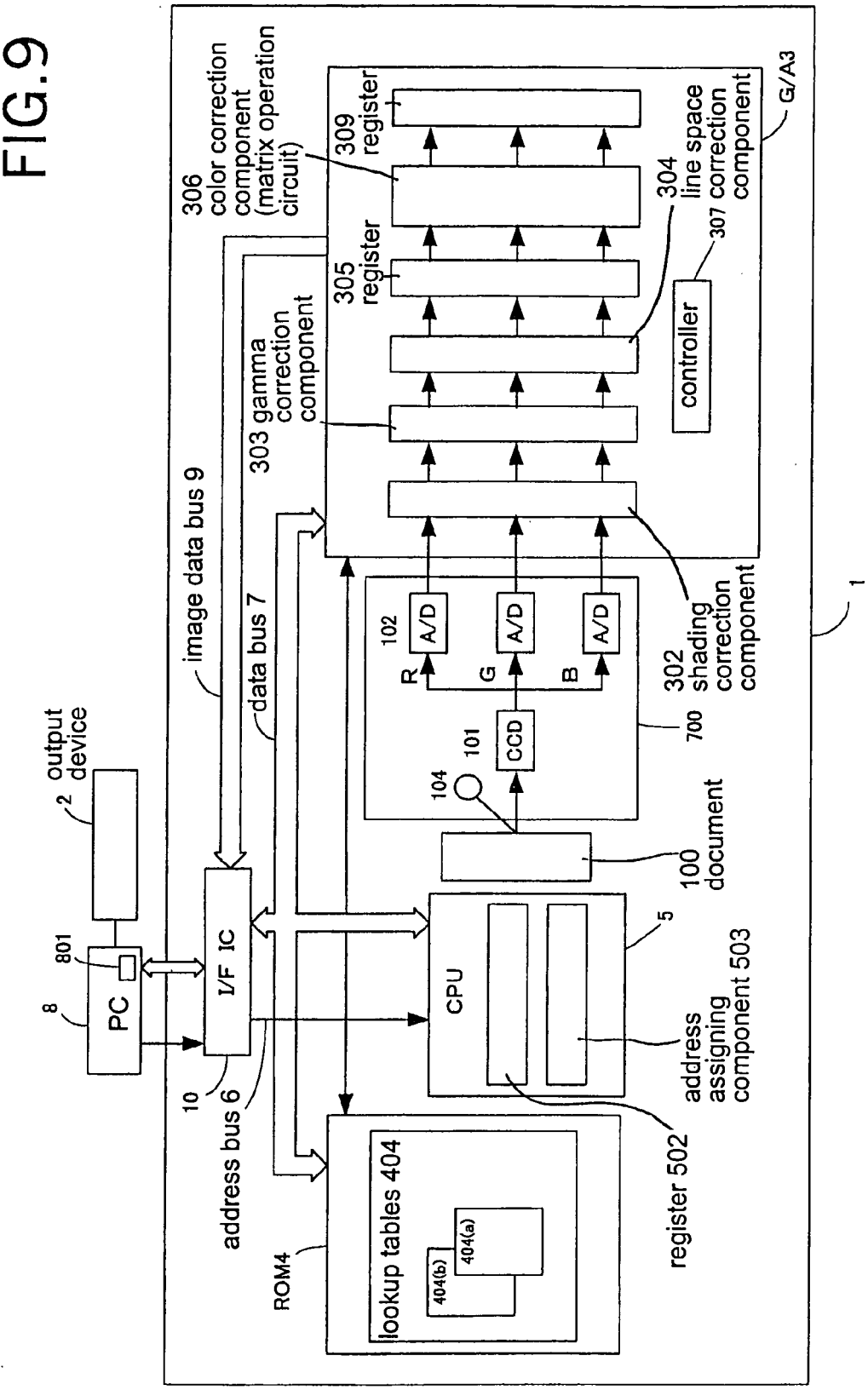
FIG. 9 is a block diagram showing a structure of the image reading apparatus of the third embodiment.

Similar to the first embodiment, FIG. 9 shows a block diagram of the present invention of a color image reading apparatus of the third embodiment that outputs to an output device via a compact, general-purpose personal computer (PC). FIG. 10 shows the lookup table 404(*a*) in which combined matrices C obtained by matrix operating on the color correction matrices A and each of the C are stored, and the lookup table 404(*b*) in which the combined matrix D obtained by matrix operating on the color correction matrices A and the monotone matrices Y are stored.

The image reading apparatus 1, just as in first and second embodiments, has a color mode which outputs read color image data in color and a monotone mode which outputs in monotone, and selection of these modes is performed by an operation component 801 (image processing mode selection means) of the connected PC 8. The mode signal of the mode selected by the operation component 801 is transmitted and received via the I/F IC 10 that controls the timing of transmission and receipt of data with the PC 8.

Also, the image reading apparatus provides with ROM 4. As shown in FIG. 10, the ROM 4 has lookup tables 404 (first correction value storing means), and lookup tables 403 are constituted by a combined C matrix lookup table 404(*a*) and a combined D matrix lookup table 404(*b*).

As shown in FIG. 10, in the combined matrix C lookup table 404(*a*), combined matrices C (C1, C2 . . . ) are respectively stored in the specified addresses. The combined matrices C are the products of the six output order changing matrices V (V1, V2 . . . V6) shown in FIG. 8 that change the output order of the image data, and the color correction matrices A (A1, A2 . . . ) that correspond to output devices. For example, as shown below, the combined matrix C1 can be obtained by multiplying the color correction matrix 1 by the output order matrix V2.

$$\text{Combined Matrix } C1 \qquad V2 \qquad A1$$
$$\begin{pmatrix} K_{11} & K_{12} & K_{13} \\ K_{31} & K_{32} & K_{33} \\ K_{21} & K_{22} & K_{23} \end{pmatrix} = \begin{bmatrix} 1 & 0 & 0 \\ 0 & 0 & 1 \\ 0 & 1 & 0 \end{bmatrix} \begin{bmatrix} K_{11} & K_{12} & K_{13} \\ K_{21} & K_{22} & K_{23} \\ K_{31} & K_{32} & K_{33} \end{bmatrix}$$

Each combined matrix C has the functions of changing the mixture ratio of each color constituent in color correction corresponding to the output device as well as determining the output order. In other words, they are the products of row exchange corresponding to the output orders. A combined matrix C is a 3×3 matrix, and constituted by coefficients (correction value data) that determine a mixture ratio of each color constituent. For example, in the case of the combined matrix C1, it is constituted by nine coefficients from $K_{11}$ to $K_{33}$, where $K_{11}$, $K_{21}$, and $K_{31}$ correspond to R, $K_{12}$, $K_{22}$, and $K_{32}$ correspond to G, and $K_{13}$, $K_{23}$, and $K_{33}$ correspond to B, respectively.

In the combined matrix D lookup table 404(*b*), combined matrices D (D1, D2 . . . ), which are products of multiplied the monotone image matrices Y (Y1, Y2 . . . ) and each of color correction matrices A which correspond to various output devices, are stored in the specified addresses. For example, as shown below, the combined matrix D1 is a product of the color correction matrix A1 and the monotone image matrix Y1.

$$\text{Combined Matrix } D1 \qquad Y1 \qquad A1$$
$$\begin{pmatrix} M_{11} & M_{12} & M_{13} \\ M_{21} & M_{22} & M_{23} \\ M_{31} & M_{32} & M_{33} \end{pmatrix} = \begin{bmatrix} N_{11} & N_{12} & N_{13} \\ N_{21} & N_{22} & N_{23} \\ N_{31} & N_{32} & N_{33} \end{bmatrix} \begin{bmatrix} K_{11} & K_{12} & K_{13} \\ K_{21} & K_{22} & K_{23} \\ K_{31} & K_{32} & K_{33} \end{bmatrix}$$

Each combined matrix D has the functions of changing the mixture ratio of each color constituent in color correction corresponding to the output device and determining the mixture ratio of the monotone image color constituents.

The CPU 5 has a register 502 (second correction value storing means) that stores matrices output from the combined matrix C lookup table 404(*a*) or the combined matrix D lookup table 404(*b*), and an address assigning component 503 (correction value specifying means) that selects matrices from the lookup table 403(*a*) or the lookup table 403(*b*) by specifying the addresses and outputs to the register 502. The register 502, as shown in FIG. 3 explained in the first embodiment, temporarily stores nine data in the respective addresses from 0H to 8H, and each matrix output from the lookup tables 403 in the addresses 0H-09. The register 502 then outputs to the matrix operation circuit of the color correction component 306.

Next, an operation of the image reading apparatus 1 of the above constitution is explained.

As shown in FIG. 8, first, either one of the color mode or the monotone mode is selected using the operation component 801 of the PC 8.

Same as in the first embodiment, the light (analog data) reflected from the document 100 and separated to each of the color constituents R, G, and B passes through the CCD 101, the A/D converter 102, the shading correction component 302, the gamma correction component 303, and the line space correction component 304. The image data then is temporarily stored in the register 305 (input image data storing means).

In the case of the color mode, the CPU 5 receives the data specifying the color correction matrix corresponding to the image characteristics of the output device 2, and the output order data indicating the output order of R, G, and B, from the PC 8. One combined matrix C (for example C1) is selected from the color correction lookup table 404(*a*) according to these data by the address assigning component 503. The combined matrix C is then output to the operation component 501 without row exchange as seen in the first embodiment.

Next, in the color correction component 306, using the combined matrix C1 output from the register 502 and the image data R, G, and B output from the register 305, the matrix operation shown below is performed. The color corrected image data R', B' and G' are temporarily stored in the register 309 (output image data storing means), and then they are output in this order to the output device 2 via the PC 8.

$$\begin{pmatrix} R' \\ G' \\ B' \end{pmatrix} = \overset{C1}{\begin{bmatrix} K_{11} & K_{12} & K_{13} \\ K_{31} & K_{32} & K_{33} \\ K_{21} & K_{22} & K_{23} \end{bmatrix}} \begin{bmatrix} R \\ G \\ B \end{bmatrix}$$

In the case of the monotone mode, the CPU 5 receives the data specifying the color correction matrix corresponding to the output device 2 and the data specifying the monotone matrix from the PC 8. Base on these data, the address assigning component 503 selects one combined matrix D (for example, D1) corresponding to the output device 2 from the combined matrix D lookup table 404(b), and outputs it to the register 502.

What is claimed is:

1. An image processing apparatus comprising:
input image data storing means for storing a plurality of input image data read for each of more than two color constituents;
first correction value storing means for storing a plurality of correction values constituted by a plurality of correction value data for sequentially correcting the input image data in units of each color constituent;
data order setting means for storing the correction value data from this first correction value storing means into a second correction value storing means in a data order according to a command that specifies output order of the color constituents;
correction operation means for sequentially correcting the input image data from the input image data storing means for each color constituent based on correction value data from the second correction value storing means; and
output image data storing means for storing and outputting corrected image data from this correction operation means,
wherein said data order setting means is operation means that resorts the data order of the correction value data from said first correction value storing means.

2. An image processing apparatus comprising:
input image data storing means for storing a plurality of input image data read for each of more than two color constituents;
first correction value storing means for storing a plurality of correction values constituted by a plurality of correction value data for sequentially correcting the input image data in units of each color constituent;
data order setting means for storing the correction value data from this first correction value storing means into a second correction value storing means in a data order according to a command that specifies output order of the color constituents;
correction operation means for sequentially correcting the input image data from the input image data storing means for each color constituent based on correction value data from the second correction value storing means; and
output image data storing means for storing and outputting corrected image data from this correction operation means,
wherein said data order setting means is address translating means provided between said first correction value storing means and said second correction value storing means.

3. An image processing apparatus comprising:
input image data storing means for storing a plurality of input image data read for each of more than two color constituents;
first correction value storing means for storing a plurality of correction values constituted by a plurality of correction value data for sequentially correcting the input image data in units of each color constituent;
data order setting means for storing the correction value data from this first correction value storing means into a second correction value storing means in a data order according to a command that specifies output order of the color constituents;
correction operation means for sequentially correcting the input image data from the input image data storing means for each color constituent based on correction value data from the second correction value storing means; and
output image data storing means for storing and outputting corrected image data from this correction operation means,
wherein said first correction value storing means is constituted by memory means that has stored a plurality of correction values in a data order corresponding to a command that specifies the output order of said color constituents, and said data order setting means is correction value specifying means that selects a single correction value from the memory means.

4. An image processing apparatus comprising:
input image data storing means for storing a plurality of input image data read for each of more than two color constituents;
first correction value storing means for storing a plurality of correction values constituted by a plurality of correction value data for sequentially correcting the input image data in units of each color constituent;
data order setting means for storing the correction value data from this first correction value storing means into a second correction value storing means in a data order according to a command that specifies output order of the color constituents;
correction operation means for sequentially correcting the input image data from the input image data storing means for each color constituent based on correction value data from the second correction value storing means; and
output image data storing means for storing and outputting corrected image data from this correction operation means,
wherein said image data is constituted by color constituents of three primary colors, said correction values are constituted by more than two correction value data for each of the three color constituents, and said correction operation means is constituted by matrix operation means.

* * * * *